United States Patent [19]

Drori

[11] Patent Number: 4,624,785

[45] Date of Patent: Nov. 25, 1986

[54] EASILY-CLEANABLE FILTERS

[76] Inventor: Mordeki Drori, 89 Zahal Street, Kiron, Israel

[21] Appl. No.: 647,094

[22] Filed: Sep. 4, 1984

[30] Foreign Application Priority Data

Sep. 2, 1983 [IL] Israel .................................... 69638

[51] Int. Cl.⁴ ......................................... B01D 29/46
[52] U.S. Cl. ..................................... 210/414; 210/488
[58] Field of Search ............... 210/108, 408, 413, 414, 210/488

[56] References Cited

U.S. PATENT DOCUMENTS

| | | | |
|---|---|---|---|
| 2,847,126 | 8/1958 | Goodman | 210/488 |
| 4,115,274 | 9/1978 | Boddeker et al. | 210/488 |
| 4,156,651 | 5/1979 | Mehoudar | 210/488 |
| 4,267,045 | 5/1981 | Hoof | 210/488 |

FOREIGN PATENT DOCUMENTS 1157258 5/1928 France .............................. 210/488
1096739 12/1967 United Kingdom .

Primary Examiner—John Adee
Attorney, Agent, or Firm—Browdy and Neimark

[57] ABSTRACT

A filter including a plurality of filter discs each formed with a central opening and disposed in a stack within a filter housing with the side faces of adjacent discs contacting each other for filtering the fluid flowing through the housing from its inlet to its outlet, the filter discs being maintained in a stack by a plurality of axially-extending rods arranged in a circular array around the outer faces of the discs and circumferentially spaced from each other to permit the filter disc stack to be cleaned by passing a cleaning nozzle through the central openings of the filter discs in the stack.

3 Claims, 4 Drawing Figures

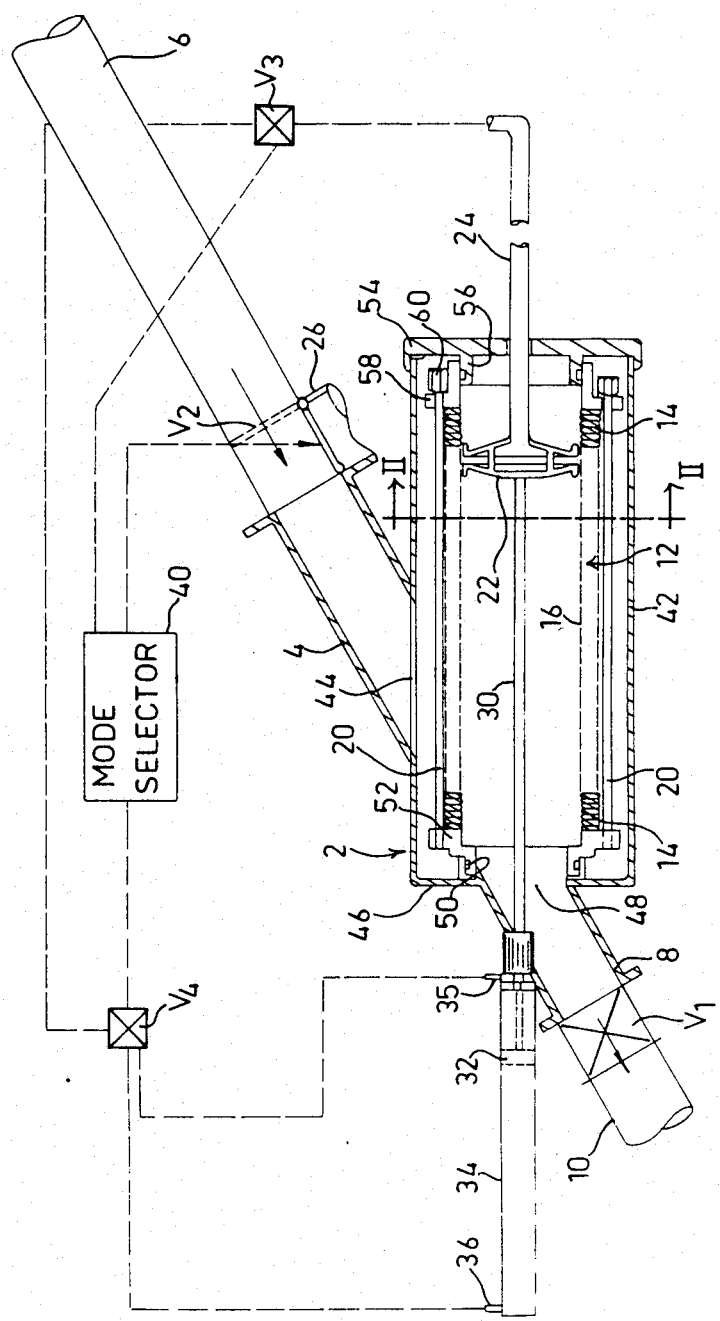

EASILY-CLEANABLE FILTERS

BACKGROUND OF THE INVENTION

The present invention relates to easily cleanable filters, and particularly to filters of the multiple disc type.

The multiple-disc type filter is now widely used in a number of different applications for filtering fluids, particularly for removing dirt particles in water irrigation systems. Briefly, this type filter includes a plurality of filter discs disposed in a stack within the filter housing, with the side faces of adjacent discs being ribbed and contacting each other to provide a large number of narrow passages for filtering the fluid flowing through the stack of discs in the radial direction. Cleaning the filter may be done manually by opening the filter housing and rinsing the discs with a water spray, or automatically by including a backwash nozzle which is automatically made operative by a differential-pressure device sensing the pressure drop across the stack of filter discs.

SUMMARY OF THE INVENTION

An object of the present invention is to provide a multiple-disc type filter having an improved construction which better facilitates cleaning the filter, particularly when the filter is automatically cleaned by a backwash nozzle.

According to a broad aspect of the present invention, there is provided a filter including a housing having an inlet and an outlet, and a plurality of filter discs each formed with a central opening and all disposed in a stack within the housing with the side faces of adjacent discs contacting each other for filtering the fluid flowing through the housing from its inlet to its outlet; characterized in that the filter discs are maintained in a stack by a plurality of axially-extending rods arranged in a circular array around the outer faces of the discs and circumferentially spaced from each other to permit the filter disc stack to be cleaned by passing a cleaning nozzle through the central openings of the filter discs in the stack.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of filter constructed in accordance with the present invention;

DESCRIPTION OF PREFERRED EMBODIMENTS

Figure 3:
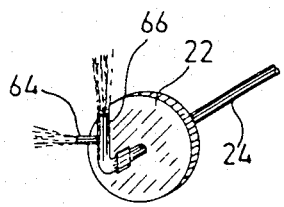
FIG. 3 illustrates one form of cleaning nozzle which may be used in the filter of FIG. 1.

The filter illustrated in FIG. 1 comprises a housing 2 including an inlet 4 connectable to an upstream supply pipe 6 for the pressurized water (or other fluid) to be filtered, and an outlet 8 connectable to the downstream pipe 10 for the filtered water. Disposed within housing 2 is the filter body 12 in the form of a stack of circular filter discs 14, each of which discs is formed with a central opening 16. As noted earlier, such filter discs include ribbed side faces which contact each other to provide a larger number of narrow passages for filtering the water as it flows radially inwardly from the inlet 4 to the outlet 8, the edges of the large central openings 16 of the discs constituting the inner or downstream face of the filter body. Since such filter discs are now well-known further details of their construction are not deemed necessary.

In the usual construction, however, the filter discs 14 are supported at their control openings 16 by a pipe or cage, with the outer or upstream faces of the discs presenting a relatively smooth surface. Such a construction is particularly used in the self-cleaning type filters which include a cleaning nozzle since the cleaning nozzle is usually located very close to the outer faces of the filter discs in order to more effectively draw out by suction the dirt particles accumulating on the outer faces of the discs.

In the present invention, however, the filter discs 14 are secured in the form of the stack by a plurality of rods 20 arranged in a circular array around the outer faces of the discs and extending axially through the filter housing 2. These rods 20 are circumferentially spaced from each other to permit the discs to be cleaned by passing a cleaning nozzle 22 through the central openings of the discs 14 in the stack 12. Thus, the stack 12 of discs presents an inner cylindrical surface which is substantially smooth and uninterrupted for accommodating the cleaning nozzle 22 and permitting it to be moved axially through the stack very close to the inner surfaces of the discs.

Cleaning nozzle 22 is not of the conventional suction type which draws out the dirt particles by suction, but rather is of a pressurized type which blows out the filter particles from between the filter discs. The cleaning nozzle is thus connected by a pipe 24 to the supply pipe 6 for feeding to the nozzle the same fluid, namely water, which is filtered by the filter body 12. Pipe 24 connecting nozzle 22 to the upstream supply pipe 6 is controlled by a valve $V_3$ so that the pressurized water is supplied to nozzle 22 only during the cleaning operation, and not during the normal filtering operation.

The illustrated filter includes a further valve $V_1$ connected between housing outlet 8 and the downstream pipe 10, which valve is open during the normal filtering operation but closed during the cleaning operation. Housing 2 further includes a dirty-water purging outlet 26, and a further valve $V_2$ between that outlet, the housing inlet 4, and the upstream supply pipe 6. Valve $V_2$ is in the full-line position illustrated in FIG. 1 during a normal filtering operation for directing the water from the upstream pipe 6 to the filter inlet 4, but is moved to the broken-line position illustrated in FIG. 1 during a cleaning operation in order to disconnect the housing inlet 4 from the upstream supply pipe 6, but to connect same to the dirty-water outlet 26.

During a cleaning operation, the filter nozzle 22 is moved axially within the filter body 12 by means of a stem 30 connected to a piston 32 displaceable within a cylinder 34 fixed to the valve housing 2. Piston 32 is displaced by the pressure of the water within supply pipe 6 controlled by a further valve $V_4$ such that during a cleaning operation pressurized water is supplied into an inlet port 35 at one side of piston 32 to move nozzle 22 in one direction (leftwardly in FIG. 1), and then into another port 36 to move the piston in the opposite direction.

All the foregoing valves are controlled by a mode selector, generally designated by box 40, which may be controlled to effect either a normal filtering mode of operation during which the filter body 12 filters out dirt particles carried by the water as the water passes through the filter from its inlet 4 to its outlet 8, or a cleaning mode of operation during which nozzle 22 cleans the filter body 12 of the dirt particules accumulated therein.

Filter housing 2 is mainly constituted of a cylindrical wall 42 formed with an opening 44 at its juncture with the inlet 4, which cylindrical wall is closed by a pair of end walls. One end wall 46 is formed with an opening 48 at its juncture with the outlet 8, and with an inwardly-extending annular rib 50 for removably receiving within it end ring 52 of the filter stack body 12. The opposite end wall 54 is removable and is also formed with an inwardly-extending annular rib 56 for receiving an end ring 58 at the opposite end of the filter stack 12. The rods 20 are secured to the two end rings 52 and 56 and are fixed thereto by fasteners 60.

It will thus be seen that the filter stack assembly 12, including the filter discs 14, rods 20, and the end rings 52 and 58, may be inserted within the housing 2 and supported as an assembly by annular ribs 50 and 56 of the two end walls 46 and 54, respectively, of the housing. The filter discs 14 may be cleaned within the housing 2 by the use of the cleaning nozzle 22, or may be removed from the housing by removing end wall 54 and then sliding out the assembly as a unit, for more thorough cleaning if desired.

One form of cleaning nozzle 22 which may be used is shown if FIG. 3, wherein it will be seen that it includes two outlets 64, 66 both issuing jets at substantially right angles to each other. Outlet 64 is eccentrically mounted so that the jet issuing therefrom will apply a rotary moment to the nozzle 22 to rotate the nozzle within the filter disc assembly 12 during the cleaning operation.

Figure 2:
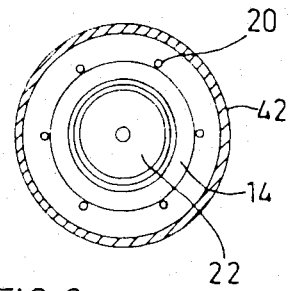
FIG. 2 is a transverse section along lines II—II of FIG. 1.

The filter illustrated in FIGS. 1–3 may be operated as follows:

During a normal filtering mode of operation, as selected by the mode selector 40, the latter controls the various valves, as follows: Valve $V_1$ is opened, thereby connecting the filter outlet 8 to the downstream pipe 10; valve $V_2$ is moved to its full-line position, thereby connecting the upstream supply pipe 6 to the filter inlet 4, and disconnecting the latter to the dirty water outlet 26; valve $V_3$ is closed, thereby interrupting the supply of pressurized water to the cleaning nozzle 22; and valve $V_4$ is closed, thereby interrupting the flow of water to the piston 32 drive for the cleaning nozzle 22. Accordingly, during this operation, the water from supply pipe 6 will be fed through the filter inlet 4, through the stack 12 of filter disc 14, and then through the outlet 8 to the downstream pipe 10.

Whenever the stack 12 of filter discs is to be cleaned, mode selector 40 is moved to effect a cleaning mode of operation, whereupon the valves are controlled as follows: Valve $V_1$ is closed to interrupt the flow of water from the housing outlet 8 to the downstream pipe 10; valve $V_2$ is moved to the broken-line position, thereby disconnecting the supply pipe 6 from the housing inlet 4, and connecting the latter to the dirty-water outlet 26; valve $V_3$ is opened, thereby supplying pressurized water via pipe 24 to the cleaning nozzle 22; and valve $V_4$ is opened, thereby supplying pressurized water first to port 34 at one side of piston 32, and then to port 36 at the opposite side to effect a reciprocatory movement of cleaning nozzle 22. During this mode of operation, the cleaning nozzle 22 is reciprocated along the inner surface of the stack 12 of filter discs 14 by piston 32, and is also rotated by the reaction force from its eccentric outlet 64, so as to apply pressurized water to the complete inner face of the stack of discs and thereby to blow out the dirt particles accumulating between the discs. These dirt particles are washed out through the dirt-purging outlet 26.

It will be appreciated that mode selector 40 can be operated either manually, or automatically, e.g. by sensing the pressure drop across the filter stack 12 and, upon sensing a predetermined pressure drop indicating a large accumulation of dirt particles, automatically switching the system from the normal filtering mode to the cleaning mode, as described above.

It will also be appreciated that the stack 12 of filter discs 14 may be conveniently removed as an assembly by merely removing end wall 54 and slipping out the assembly from the filter housing 2, whereupon the filter discs 14 may also be cleaned as an assembly, or may be separated for more thorough cleaning.

Figure 4:
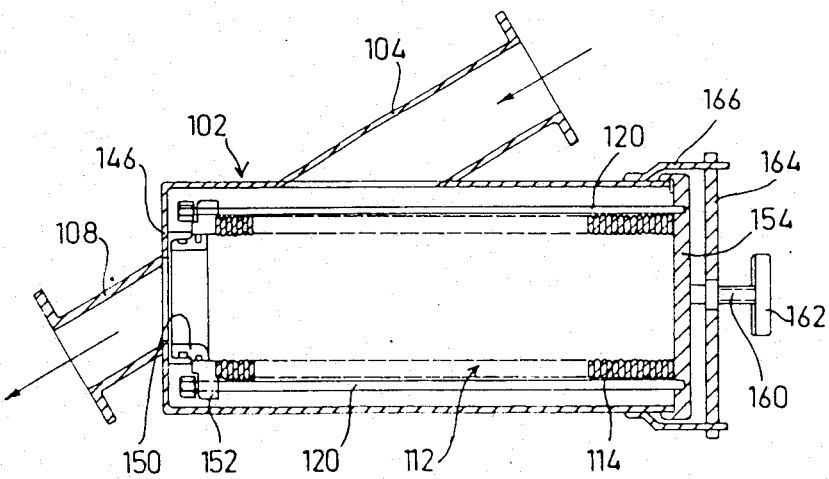
FIG. 4 illustrates another type of multiple-disc filter constructed in accordance with the present invention.

FIG. 4 illustrates another embodiment of the invention particularly useful for manual cleaning of the filter discs in the stack by removing them from the housing. Thus, the housing 102 also includes an inlet 104, an outlet 108, an end wall 146 fixed at one end of the housing, and a removable end wall 154 at the opposite end. The stack 112 of filter discs 114 is also supported as an assembly by means of a plurality of axially-extending rods 120 arranged in a circular array around the outer faces of the discs 114 of the stack 112, and secured at one end to end ring 152 supported by annular rib 150 fixed to the housing end wall 146. Rods 120 are supported at their opposite ends by being received within openings formed in the removable end wall 154. The latter end wall is normally secured to the end of housing 102 by a clamp 160 having an enlarged head 162 at its outer end, with its inner end being threaded through an opening in a rod 164 whose opposite ends pass through openings in a pair of brackets 166 fixed to the opposite sides of the housing 102.

Thus, whenever it is desired to open the filter housing 102 for cleaning the stack 112 of filter discs 114, it is only necessary to remove clamp 160 and then remove rod 164, which thereby permits the housing end wall 154 to be removed to provide access into the interior of the filter housing. The stack 112 of discs 114 may be removed with end wall 154 as an assembly, or the end wall 154 may first be removed and the discs 114 of the stack 112 may then be individually removed.

While the invention has been described with respect to two preferred embodiments, it will be appreciated that many other variations, modifications, and applications of the invention may be made.

What is claimed is:
1. A filter including a housing having an inlet, an outlet, and a dirt-purging opening;
a plurality of circular filter discs in said housing with each disc being formed with a central opening, and all the discs being disposed in a stack with the side faces of adjacent discs contacting each other for filtering the fluid flowing through the housing from its inlet to its outlet;
a pair of end rings at the opposite ends of said stack of filter discs and of larger outer diameter than said filter discs, said end rings being formed with a plurality of openings therethrough around a circle of larger diameter than said filter discs;

a circular array of axially-extending rods passing through said openings in said end discs and circumferentially-spaced from each other;

the outer surfaces of said filter discs constituting upstream side of the filter discs and facing said housing inlet and dirt-purging opening, and the inner surfaces of said filter discs defined by their central openings constituting the downstream side of the filter stack and facing said housing outlet;

and a cleaning nozzle movable axially within said central openings of the filter discs for cleaning the filter disc stack, said cleaning nozzle including means for connecting it to a pressurized source of the fluid to be filtered for blowing out the filtered particles from between the filter discs in the stack through said circumferential spaces between the axially-extending rods and said dirt-purging opening, said cleaning nozzle also including means for outletting a fluid jet eccentric to the axis of the nozzle so as to rotate the nozzle by the reaction force applied thereto by said eccentric jet.

2. The filter according to claim 1, wherein said cleaning nozzle outlets fluid in the form of a jet and includes means for rotating the nozzle at the time of the issuance of the jet.

3. The filter according to claim 2,
further including a mode selector for selecting either a filter mode of operation or a cleaning mode of operation, and valve means effective during the cleaning mode of operation to direct the fluid from said housing inlet through the filter stack to the housing outlet, and during the cleaning mode of operation to direct the fluid through the nozzle, the filter stack, and out through said dirt-purging opening in the housing.

* * * * *